March 1, 1927.
C. W. LEGUILLON
1,619,079
METHOD AND APPARATUS FOR PREPARING PLASTIC STOCK
Filed July 26, 1923   5 Sheets-Sheet 1
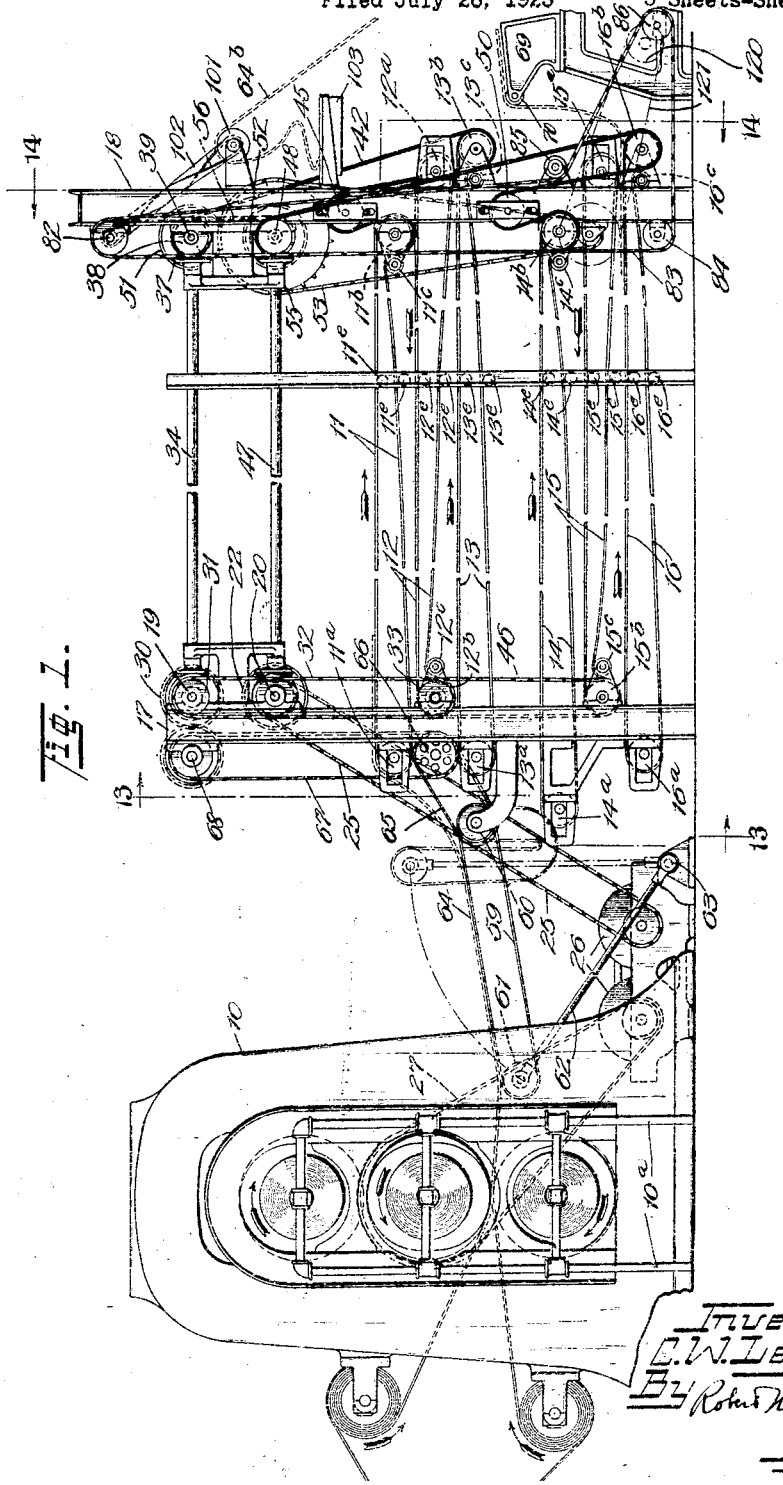
Inventor.
C. W. Leguillon
By Robert N. Pierson
Atty.

March 1, 1927.
C. W. LEGUILLON
1,619,079
METHOD AND APPARATUS FOR PREPARING PLASTIC STOCK
Filed July 26, 1923   5 Sheets-Sheet 2
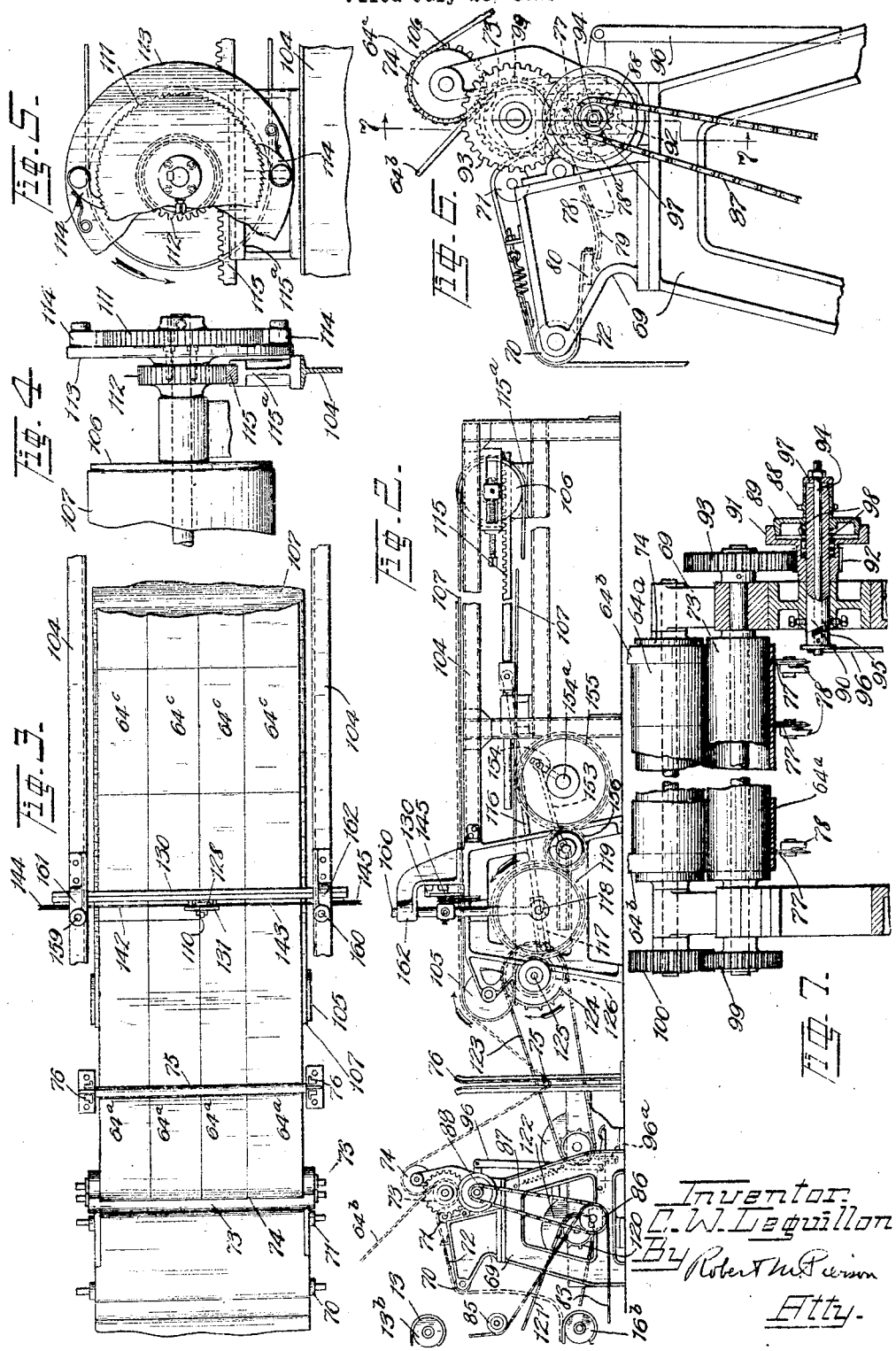
Inventor
C. W. Leguillon
By Robert McPherson
Atty.

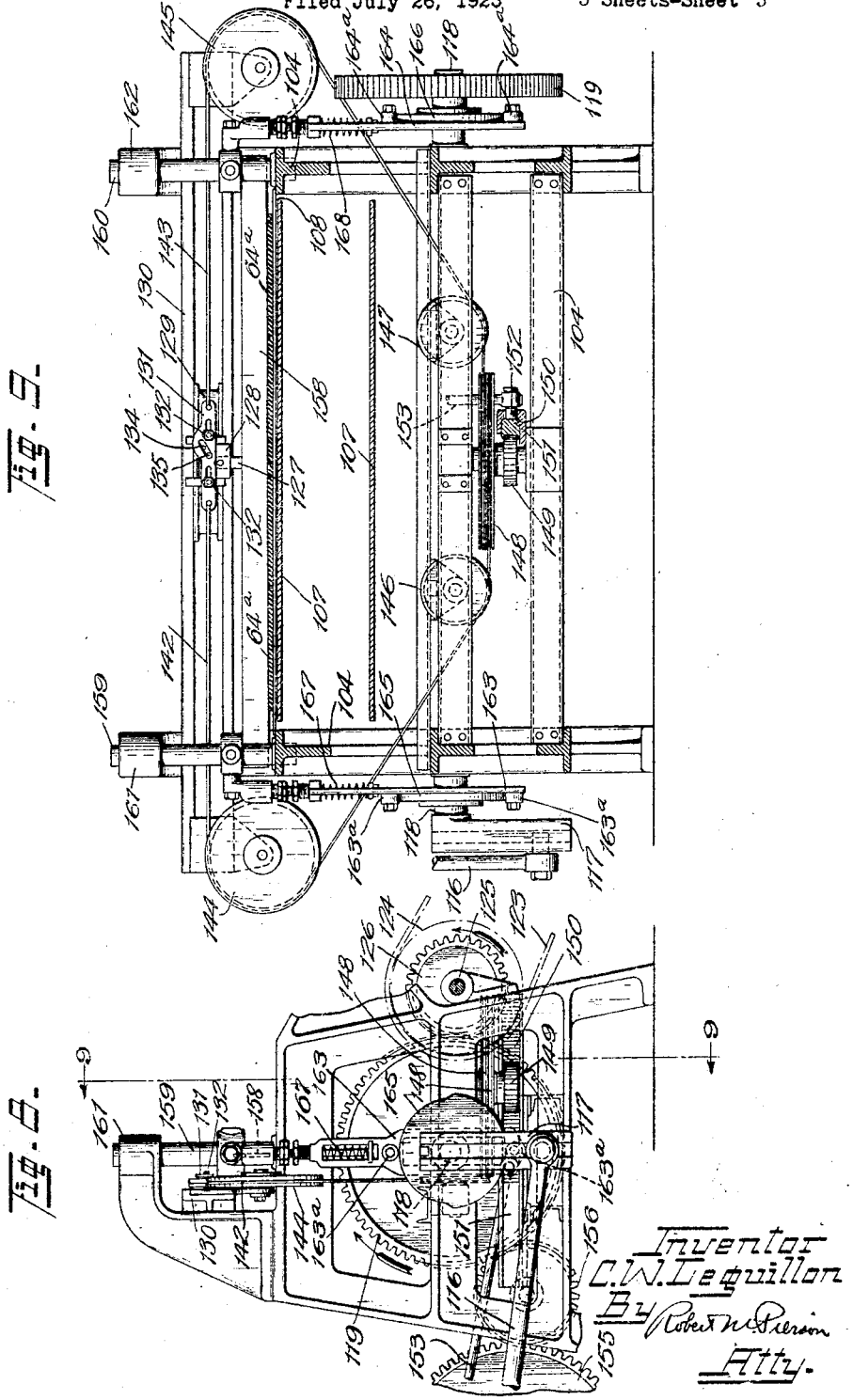

March 1, 1927.  1,619,079
C. W. LEGUILLON
METHOD AND APPARATUS FOR PREPARING PLASTIC STOCK
Filed July 26, 1923   5 Sheets-Sheet 4

Inventor
C. W. Leguillon.
By Robert M. Pierson
Atty.

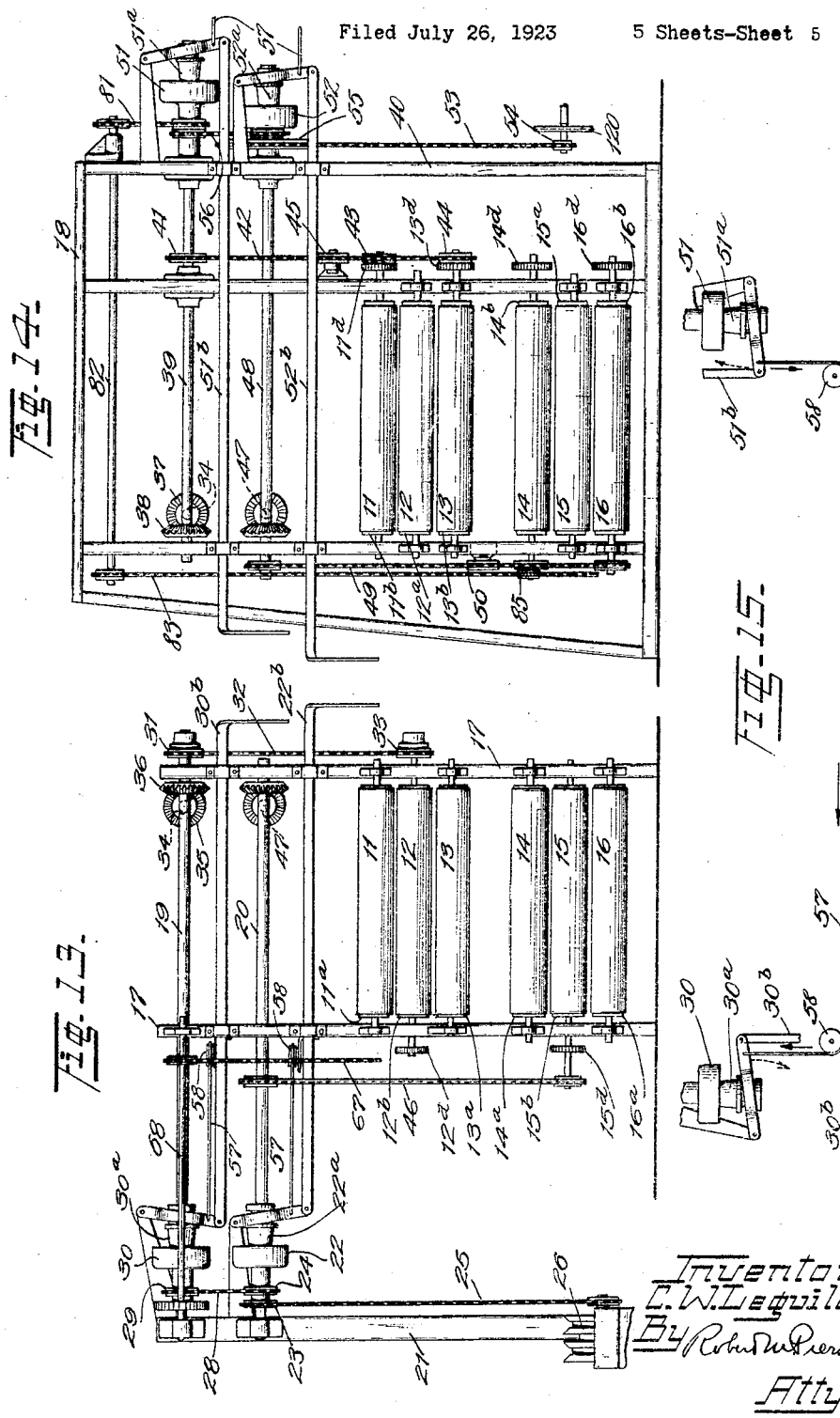

Patented Mar. 1, 1927.

1,619,079

UNITED STATES PATENT OFFICE.

CHARLES W. LEGUILLON, OF AKRON, OHIO, ASSIGNOR TO THE B. F. GOODRICH COMPANY, OF NEW YORK, N. Y., A CORPORATION OF NEW YORK.

METHOD AND APPARATUS FOR PREPARING PLASTIC STOCK.

Application filed July 26, 1923. Serial No. 653,910.

This invention relates to the art of forming units of plastic sheet material, an example being the preparation of such units from a hard-rubber compound such as is commonly used as a battery jar stock. Such stocks are usually sheeted upon a heated calender and the sheet, after coming from the calender, requires to be cooled for shrinkage before being cut into units. For purposes of illustration, I show and describe herein an embodiment of my invention adapted to produce rectangular units of sheeted stock each adapted to be wrapped about a battery jar mandrel to form the four side-walls of the jar, and each unit being skived or beveled at its ends so that the latter may be joined in a beveled seam upon the mandrel.

Heretofore, so far as I am aware, the cooling of the stock before cutting it into units has been effected by storage of the sheeted stock, as by winding it into a roll with a liner as it comes from the calender and allowing it to remain in the roll for a considerable time, usually about forty-eight hours.
The shrinkage of the stock incident to such cooling frequently has caused it so to grip the liner as to become so badly stuck thereto that its removal has resulted in great damage to both the stock and the liner.
After such cooling the stock has been withdrawn from the roll, passed through a slitting machine adapted to cut it lengthwise into skived strips, and then under a guillotine cutter to sever the skived strips into battery jar units disposed transversely of the original sheet.

As the stock, even after such aging or cooling as can conveniently be given to it, will shrink more or less longitudinally, although little or not at all transversely, of the calendered sheet, it is desirable that the skived end-edges run cross-wise of the calendered sheet, so that such shrinkage lengthwise of the calendered sheet will be circumferential with relation to the jar, so as to be taken care of by the skived seam. In the prior practice referred to, on the contrary, the greater shrinkage has been vertically of the jar, frequently resulting in defective bottom seams or in undue variation in the height of the jars.

My general object is to provide a rapid, economical and labor-saving method and apparatus for producing formed units of sheeted plastic stock. More specific objects are to eliminate the extended storage of the stock in a liner, to shorten the time required for cooling the stock and transporting it from in rolling the stock and transporting it from the calender to storage and from storage to the cutter, and to provide for so cutting the units that the skived end-edges of each will lie cross-wise of the calendered sheet.

Of the accompanying drawings:

Fig. 1 is a somewhat diagrammatic, front elevation of parts of my apparatus in its preferred form, including the calender and the stock-conveying and cooling mechanism.

Fig. 2 is a corresponding view of the parts of the apparatus to which the stock passes from the conveying and cooling mechanism of Fig. 1, including means for slitting the calendered sheet into a plurality of longitudinal strips and a traveling-knife cutter for severing the slitted strips cross-wise, with a skived cut.

Fig. 3 is a plan view of parts of the apparatus shown in Fig. 2.

Fig. 4 is a fragmentary elevation of parts of an endless conveyor mechanism, including a rack-pinion-ratchet-pawl device for intermittently moving the work past the traveling-knife cutter.

Fig. 5 is a rear elevation of the same, from the right of Fig. 4.

Fig. 6 is an enlargement of a part of Fig. 2 showing details of the longitudinal slitter.

Fig. 7 is a section on line 7—7 of Fig. 6, with parts broken away.

Fig. 8 is a rear elevation of the transverse or traveling-knife cutter.

Fig. 9 is a section on line 9—9 of Fig. 8.

Fig. 10 is a vertical, longitudinal section on line 10—10 of Fig. 11, through the transverse cutter.

Fig. 11 is a vertical section showing parts of the transverse cutter as viewed from the right of Fig. 10.

Fig. 12 is a horizontal section on line 12—12 of Fig. 10 or 11.

Fig. 13 is a sectional elevation on line 13—13 of Fig. 1.

Fig. 14 is a sectional elevation on line 14—14 of Fig. 1.

Fig. 15 is a diagram of a pair of clutches adapted selectively to drive a conveyor, and a connection between them such that when one is engaged the other will be disengaged.

Sheet-forming, conveying and cooling mechanism.

The apparatus shown in the accompanying drawings comprises a calender 10, which may be provided with the usual heating means, such as the steam pipes $10^a$, $10^a$, and may be adapted either to sheet the stock originally or to ply up separate sheets as shown, $10^b$, $10^b$, being rolls of warm, freshly sheeted stock interwound with liners $10^c$, $10^c$, respectively said rolls being rotatably supported upon the calender frame. Suitable rewinding rolls (not shown) may be provided for said liners.

The apparatus also comprises an upper set of endless belts 11, 12, 13 adapted to carry the stock forward from the calender, then backward, and again forward, to cool it, receiving the stock from the calender in alternation with a lower set of endless belts 14, 15, 16, similarly arranged, and the respective sets of belts are also adapted to alternate in delivering stock to the slitters, the upper set of belts being filled from the calender while the lower set is emptied to the slitters, and vice versa, and each set of belts being adapted to be driven in timed relation with the calender as it is filled and in timed relation with the slitters as it is emptied.

The belts are so mounted, between distantly spaced frame structures 17, 18, aligned with the calender, that the delivery end of one belt is positioned over an intermediate part of another, so that in each set the stock will pass by gravity from one belt onto the next, with a reversal of direction and inversion of the stock, and so be passed forward from the calender, then back toward it, and then again forward to the slitters. Each belt is mounted on a loosely-journaled end roll at its stock-receiving end, such roll for each belt being designated by the numeral of the belt and the exponent $a$, and on a driven end roll at its delivery end, such driven rolls being given the number of its respective belt with the exponent $b$. Each belt is thus adapted to be driven from its delivery end, as this is found to give a more steady movement to its stock-carrying, upper reach.

Adjacent each of said driven rolls is journaled, on the frame structure 17 or 18, a guide roll adapted to cause the belt to contact a large part of the periphery of the drive roll so as to assure a strong driving grip of the belt on the drive roll. Said guide rolls are designated by the numerals of their respective belts, with the exponent $c$. Each of said guide rolls is also adapted to be driven, being provided with a spur gear (not shown) secured to its shaft at the rear side of the machine and meshed with a spur gear secured to the shaft of the adjacent, driven, end roll, the last mentioned spur gears being shown in Figs. 13 and 14, where they are designated by the respective numerals of their belts, with the exponent $d$. $11^e$, $11^e$, $12^e$, $12^e$, etc., Fig. 1 are rolls journaled on standards between the frame structures 17 and 18 and adapted to support the belts at intermediate positions.

The mechanism for driving the endless belt carriers, 11 to 16, comprises a pair of parallel, transverse shafts 19, 20 journaled near the top of the frame structure 17, their rear ends extending into bearings secured on a standard 21 (Fig. 13). Loosely journaled on the lower shaft, 20, adjacent said standard, is the female member, 22, of a cone-clutch, secured on a common hub with two sprockets, 23, 24. 25 is a sprocket chain running to the sprocket 23 from a Reeves variable-speed drive 26, adapted to be driven from the calendar 10 through a sprocket chain 27, and 28 (Fig. 13) is a sprocket chain connecting the sprocket 24 with a sprocket 29 on a common hub with a female cone-clutch member 30 loosely journaled on the upper transverse shaft, 19, the cone-clutch members 22 and 30 thus being adapted to be constantly driven, both counter-clockwise as viewed in Fig. 1, whenever the calender is driven, but at such speed as may be determined by the setting of the Reeves variable speed device 26.

Splined upon the transverse shafts 19, 20 are male cone-clutch members $30^a$, $22^a$ respectively, provided with extension controls $30^b$, $22^b$ running to the front of the apparatus. The shafts 19, 20 are provided with gearing presently to be described by which they are adapted respectively to drive the upper and lower sets of conveyor belts heretofore described, the provision of the clutches 22, 30 permitting the driving of one of the sets of belts while the other stands idle or is driven from the slitters.

The driving connection between the transverse shaft 19 and the upper set of belts comprises a sprocket 31 secured on the front end of said shaft and connected by a sprocket-chain 32 with a sprocket 33 secured on the shaft of the belt-driving roll $12^b$. For driving the belts 11 and 13, from the farther end, said driving connection comprises a shaft 34 extending lengthwise of the belts, between the frame structures 17, 18, and having driving connection with the shaft 19 through bevel gears 35, 36, and at its other end, through bevel gears 37, 38, with a transverse shaft 39 journaled on the frame structure 18 and extending through a bearing on a standard 40 at the rear side thereof.

A sprocket 41 (Fig. 14) secured on the shaft 39, is connected by a sprocket chain 42 with sprockets 43, 44 on the shafts of the belt-driving rolls $11^b$, $13^b$ respectively, said chain also passing over an idler sprocket 45, and said chain being adapted to drive the belts 11 and 13 while the middle belt, 12, is driven through the sprocket chain 32, at the calender end of the device as above described.

The driving connections between the transverse shaft 20 and the lower set of belts is substantially the same as that just described with reference to the shaft 19 and the upper set of belts, said shaft 20 having driving connection, through a sprocket chain 46, with the belt-driving roll 15$^b$, and through a longitudinal shaft 47, transverse shaft 48 at the opposite end of the device, and sprocket chain 49, with the belt-driving rolls 14$^b$ and 16$^b$, said sprocket chain also passing over an idler sprocket 50.

The transverse shafts 39, 48, journaled on the frame structure 18, have loosely journaled thereon respective female cone-clutch members 51, 52, adapted to be constantly driven, clockwise as viewed in Fig. 1, when the slitters are in operation, by a sprocket chain 53 connecting the sprocket 54 of a motor (not shown) with a sprocket 55 secured to the hub of the clutch member 52, and a sprocket chain 56 connecting sprockets on the respective hubs of the two female cone-clutch members. The male members, 51$^a$, 52$^a$, of the respective clutches, are splined upon the respective shafts 39, 48 and provided with extension controls 51$^b$, 52$^b$, running to the front side of the apparatus, so that the upper clutch 51—51$^a$, may be thrown in to drive the upper set of belts from the motor, through the sprocket chain 53, in time with the cutting apparatus hereinafter described, while the lower set of belts stands idle or is driven from the calender, or the lower set of belts may be driven in time with such cutting apparatus, through the clutch 52—52$^a$ while the upper set of belts stands idle or is being filled from the calender.

To assure that the upper set of belts, for example, will not be in driving connection through the clutch 30—30$^a$ at the calender end and through the clutch 51—51$^a$ at the slitter end both at the same time, with the incident danger of breakage, a cable 57, shown diagrammatically in Fig. 15, passing over pulleys 58, 58 mounted on the frame structures 17, 18, so connects the controls of the male clutch members 30$^a$, 51$^a$ that when one is engaged the other, if engaged, is automatically disengaged.

A connection in all respects the same, and therefore not necessary to be shown, is provided between the male clutch members 22$^a$ and 52$^a$, associated with the lower set of belts.

It will be seen that each set of belts, upper and lower, may be driven independently of the other set, and may be driven from the calender while being filled with stock, and from the motor, which also drives the slitters, while the stock is being run from the belts to the slitters.

For leading the stock from the calender to either the top belt 11 of the upper set or the top belt 14 of the lower set, according as the upper or lower set of belts is to be filled, I provide an endless belt carrier 59 (Fig. 1), mounted on a drive roll 60 journaled on the frame structure 17 and on an idler roll 61 journaled on the outer ends of a pair of arms, one of which is shown at 62, said arms being pivoted as at 63 to floor brackets, so that they may be let down toward the calender for operation, as shown in full lines in Fig. 1, their weight and that of the idler roll 61 holding the belt 59 taut, or may be raised to vertical, inoperative positions, as shown in broken lines in Fig. 1, to permit access to the delivery side of the calender. The sheeted stock, passing from the calender, over the belt 59 and onto the upper belt 11 of the upper set, is shown at 64 (Fig. 1).

For driving the belt 59, its drive roll 60 has driving connection through a sprocket chain 65, a twin sprocket 66 and a sprocket chain 67, with a shaft 68 geared to the female clutch member 30, so that the belt 59 will be continuously driven, through the Reeves variable speed drive 26, whenever the calender is in operation and the belt 59 in operative position.

Longitudinal slitter.

The mechanism for slitting the stock longitudinally, as it is withdrawn from the upper or from the lower set of belts, comprises a frame 69 in which are journaled successive guide rolls 70, 71, the former being provided with a strap brake 72 for tensioning the stock. Also journaled in said frame are work-driving rolls 73 and 74 adapted to drive the stock forward, withdrawing it from the upper or lower set of endless belts above described and advancing it into a storage loop supported at its other end by mechanism hereinafter described, and said loop is weighted by a transverse floating bar 75 running in vertical guides 76, 76 rising from the floor. The rolls 73 and 74 are so positioned with respect to the guide roll 71 and the floating bar 75 as to cause the stock to be carried on their peripheries throughout a large part of the orbit of each, to assure a good driving engagement of the rolls and stock. 77, 77 are a set of rotary slitting knives supported in the usual manner in the frame 69 and adapted, cutting against the roll 73, to slit the stock 64 into longitudinal strips 64$^a$ as it is driven forward, said knives being journaled on arms such as 78, the latter being pivoted on a transverse bar 78$^a$ mounted in the frame 69, and said knives being adapted to be yieldingly held against the roll 73 by springs such as 79 extending from the opposite ends of said arms and bearing against a stationary bar 80 secured in the frame 69, said bar also serving as an anchor for the strap of the brake 72.

The driving connection for the slitter roll 73 leads from the motor sprocket 54, and may best be traced by referring first to Fig. 14, where 81 is a sprocket chain operatively connecting the upper female cone-clutch member 51 with a transverse shaft 82 in the frame structure 18, said shaft being operatively connected at its front end, by a sprocket chain 83, running over idler sprockets 84, 85, with a twin sprocket 86 journaled on the base of the slitter frame 69 and connected by a sprocket chain 87 (Figs. 2 and 6) with a sprocket 88 formed on a common hub with a male cone-clutch member 89 (Fig. 7) rotatably and slidably mounted on a hollow fixed, stub shaft 90 projecting from the slitter frame and having journaled thereon and adapted to coact with the male clutch member 89, a female cone-clutch member 91 formed at its hub with a spur gear 92 meshed with a spur gear 93 secured to the shaft of the slitter roll 73. Mounted in the hollow stub shaft 90 is a clutch-actuating bar 94 having a cam member 95 secured on its inner end and adapted to act against a cam face on the rear end of said stub shaft, through rotation of said bar by a treadle device 96, provided with a hold-down hook 96$^a$, (Fig. 2), to slide the sprocket 88 and male clutch member 89 axially on said stub shaft, to engage the clutch, such action being effected through the medium of a cap 97 secured on the outer end of said bar and fitting over the outer end of the stub shaft. A compression spring 98 mounted in a concentric counter-bore in the outer end of the female clutch member 91, bears against the adjacent face of the male clutch member 89, being thus adapted to force said member 89 against the cap 97 to disengage the clutch when the treadle is released.

The work driving roll 74 is adapted to be driven by intermeshed gears 99, 100, shown in Fig. 7, secured upon the respective shafts of the rolls 73 and 74.

For disposing of the selvage or trimmings at the sides of the calendered sheet as the longitudinal strips 64$^a$ are cut therefrom, a waisted roll 101 (Fig. 1) is journaled on the frame structure 18 and adapted to be driven by a crossed belt 102 from the shaft 82, to withdraw the selvage strips, 64$^b$, from the roll 73 of the longitudinal slitter and deposit them in a box 103 mounted on the frame structure 18.

*Unit-severing device.*

Beyond the longitudinal slitter just described are provided instrumentalities for cutting the longitudinal strips of stock 64$^a$ transversely into longitudinally disposed, rectangular, battery jar units, 64$^c$, 64$^c$ (Fig. 3), having skived end edges. These instrumentalities comprise a long frame, represented generally by the numeral 104, in which are journaled supporting rolls 105, 106, for an endless belt 107 adapted to receive the strips 64$^a$ and carry them forward side by side, in successive movements.

Extending across the top face of the upper reach of the endless belt 107 is a bridge or cutting plate 108, secured at its ends to the frame 104 and provided with a groove 109 in its upper face disposed at right-angles to the movement of the work and adapted to accommodate the point of a slanted, traveling knife 110 provided with actuating mechanism hereinafter described, said plate being adapted to support the stock as the latter intermittently slides thereover, the adjacent part of the belt passing under the plate, and said knife being adapted to be run the length of said groove to sever all of the strips 64$^a$ transversely, with a skived or beveled cut, between forward movements of the stock.

For intermittently driving the belt 107, to advance the work for successive cuts of the knife 110, the belt-supporting roll 106 at the delivery end of the belt is provided at its rear end, beyond its bearing, with a ratchet 111 (Figs. 4 and 5) secured to its shaft, and journaled on its shaft between its bearing and said ratchet is a pinion 112 and a pawl carrier 113, secured together at their hubs, the pawl carrier having a pair of spring-backed pawls 114, 114 associated with the ratchet 111 and the pinion being meshed with a rack 115 mounted in a guideway 115$^a$ secured to the frame 104, this arrangement being such as to drive the belt roll 106 intermittently as the rack 115 is reciprocated in its guideway. The pawls 114 may be arranged in out-of-step relation, in a well known manner, to reduce the amount of lost motion in their engagement with the ratchet and so make possible fine adjustments of the length of the rolls' successive movements without excessively fine ratchet teeth.

For so reciprocating the rack 115 it is connected by a pitman 116 (Figs. 2, 8 and 9) with a variable-length crank 117 secured to the rear end of a drive-shaft 118 journaled in the frame 104, said shaft being provided at its front end with a driving gear 119, the latter being adapted to be driven, by the same motor which drives the longitudinal slitter, through a motor sprocket 120 (Figs. 1 and 14), sprocket chain 121 (Figs. 1 and 2), Reeves variable speed drive 122 (Fig. 2), sprocket chain 123, sprocket 124, shaft 125 and gear 126 (Figs. 2 and 8).

The traveling knife 110, as will best be seen by reference to Figs. 10, 11, and 12, is clamped in a foot-like holder 127, at an appropriate angle to produce a skived cut of the stock, and said holder is so mounted and provided with driving means as to carry the knife across the work from the left to right as viewed in Fig. 11, in the cutting operation, with the point of the knife extending through the stock into the groove 109 of the bridge or cutting-plate 108, and then to lift the knife and return it, free of the work, to the left-hand side of the apparatus.

The supporting and actuating mechanism for the knife-holder 127 comprises a dovetail slide 128, to which the knife holder is attached, said slide being mounted for vertical movement on a second dove-tail slide 129, the latter being mounted on a horizontal guide or bridge 130 extending transversely across the work over the line of cut.

For reciprocating the slide 129 and for lowering the knife-holder 127 at the beginning of each cut and raising it for the return movement, a cam plate 131 is slidably retained on the face of the slide 129 by screw-bolts 132, 132 mounted in horizontal slots 133, 133, in said cam plate and threaded into the horizontally moving slide 129, and said cam plate is formed with an inclined or oblique cam slot 134 into which a cam stud 135 projects from the vertically moving slide 128, whereby the latter is adapted to be raised and lowered by such limited, horizontal movement of the cam plate 131 with relation to the slides 128 and 131 as is permitted by the slots 133. The weight and friction of the horizontally moving slide 129 in its guideway affords such resistance as to cause the vertically moving slide 128 to be raised and held in its uppermost position, by the action of the stud 135 in its cam slot 134, while the slide 129 is being propelled to the left by a pull on the cam plate 131, and similarly to cause the vertically moving slide to be lowered and held in its lowermost position while the slide 129 is being propelled to the right by a pull on said cam plate.

The vertically moving slide 128 is recessed to receive the shank of the knife-holder 127, and the latter is pivoted to the front wall of the slide at 136 and at a lower point is provided with a set screw 137 mounted in an arcuate slot in said front wall, whereby the knife holder may be secured in different positions about its pivot 136, to vary the angle of the knife to the work. A pair of opposed set screws 138, 138 are mounted in the slide 128 and adapted to bear on opposite sides of the knife-holder 127, for very fine adjustments of the latter and to hold it securely in position. 139 is a bracket secured to the horizontally moving slide 129 by a screw 140, said bracket extending into a vertical slot in the vertically moving slide 128 and being adapted to be abutted by a set-screw 141 threaded through the upper end-wall of said slot, to limit the downward movement of the slide 128 so as to prevent the point of the knife 110 from resting on the floor of the groove 109 in the plate 108.

The knife-supporting and actuating structure just described is adapted to be run back and forth on the guide-way or bridge 130, raising and lowering the knife and reciprocating it across the work in timed relation to the successive forward movements of the work, by a pair of cables 142, 143 secured to the respective ends of the cam plate 131 and running over respective pulleys 144, 145 (Fig. 9) mounted at the opposite ends of the bridge 130 and over respective guide pulleys 146, 147 below the work, from which said cables run onto a capstan pulley 148 journaled in the lower part of the frame 104 and having a drive pinion 149 on its hub. Meshed with said drive pinion is a rack 150 (Figs. 8 and 9) slidably mounted in a guide 151, the latter being formed with a slot in its back through which a driving stud 152 projects from the rack 150, said stud having pivoted thereon, at the back of the guide, a pitman 153 pivoted to a crank 154 secured on a jack-shaft 154$^a$ on the front end of which is secured a gear 155 meshed with an idler gear 156, the latter being meshed with the drive gear 119 on the shaft 118, and the gear ratios being such that the knife 110, by the pull of the cable 143, is run forward across the work in a cutting operation during each outward, inoperative movement of the belt-driving rack 115, and, by the pull of the opposite cable 142, is run, free of the work, back to its starting point at the rear of the apparatus, during the forward movement of the work imparted by the return stroke of the belt-driving rack 115.

For pressing the work against the plate 108 along each side of the line of cut, a pair of parallel presser bars 157, 158, seen best in Figs. 10 and 11, are secured at their ends to vertical posts 159, 160, slidably mounted in the frame 104 and in guide-brackets 161, 162 rising therefrom, and said posts are adapted to be lowered to hold the presser bars in pressing position upon the work during each cutting operation, and to be raised between cuts to permit the advance of the work, by cam yokes 163, 164 (Figs. 8 and 9), slotted to accommodate the shaft 118 and having cam rollers 163$^a$, 163$^a$, 164$^a$, 164$^a$, running on cam disks 165, 166 secured on said shaft. To provide a yielding pressure of the presser bars 157, 158 upon the work, compression springs 167, 168 are interposed operatively between the respective cam yokes 163, 164 and the presser-bar posts 159, 160, as will be readily understood by reference to Figs. 8 and 9.

Operation.

In the operation of the apparatus, the clutch 30—30ª being engaged and the calender being operated in any known or suitable manner, as in plying together the fresh warm sheets from the rolls 10ᵇ, 10ᵇ, as shown to deliver a sheet of stock 64, the latter, carried from the calender by the belt 59, is fed onto the upper set of cooling belts, 11, 12, 13 until they are filled or contain such quantity of stock as may be desired, said upper set of belts being driven from the calender, in timed relation thereto controlled by the Reeves variable speed drive 26, during this operation.

The clutch 30—30ª, through which said upper set of belts is driven from the calender, is then thrown out, slacking the cable 57 (Fig. 15) but leaving the clutch 51—51ª out, and so leaving the upper set of belts stationary, while the stock 64, continuing to be drawn from the calender by the belt-carrier 59, is severed adjacent the belt roll 60 and started onto the upper belt, 14, of the lower set, the clutch 22, 22ª being thrown in to drive the lower set of belts in time with the calender, and the cable connection between the clutches 22—22ª and 52—52ª assuring the disengagement of the latter clutch.

While the lower set of belts is being filled with stock the upper set is emptied to the slitters, the operator throwing in the clutch 51—51ª, to drive the upper set of belts and the slitters in timed relation, from the motor. The stock from the upper set of belts is threaded by hand through the two slitters, and the selvage strips are carried over the roll 101, all as shown in Figs. 2 and 1, whereupon the main body of the stock is slit into longitudinal strips 64ª, 64ª, by the slitting disks 77, and is fed forward continuously by the driving rolls 73, 74 and intermittently by the endless belt 107, the braked roll 70 tensioning the work as it passes to the slitting disks and the floating bar 75 assuring proper tension and orderly, side-by-side arrangement of the strips 64ª as they pass through the storage loop to said endless belt.

Between successive forward movements of the work on the belt 107, as the latter is intermittently driven by the rack 115, the traveling knife 110, actuated by the cables 142, 143, is run across the full width of the work at right angles to the strips 64ª, as shown clearly in Fig. 3, severing them into rectangular battery jar units 64ᶜ, 64ᶜ, with a skived cut, and these, carried forward in place upon the endless belt 107, are lifted therefrom by hand and disposed of, as by booking them between sheets of liner.

The upper set of cooling and conveying belts 11, 12, 13 being thus emptied of stock while the lower set 14, 15, 16, is filled, the lower set is then similarly emptied while the upper set is again filled, each set of belts being driven from the calender while being filled and from the motor while being emptied. By so alternating them the calender and the slitters may be kept in substantially continuous operation, and yet the stock has sufficient time to cool between the calender and the slitters, so that only a small amount of shrinkage occurs in the stock after it is cut into units. As such shrinkage of the cut unit is nearly all lengthwise thereof, it is in such direction that the beveled end edges of the unit, overlapping each other on the mandrel in the subsequent building of the battery jar, are adapted to form a closed seam notwithstanding such shrinkage.

In passing from one of the cooling belts to another the stock is inverted, so that first one side thereof and then the other is exposed to the air, and this results in rapid and even cooling of the stock. The variable-length crank 117 permits adjustment of the length of stroke of the rack 115 so as to vary the length of the stock units, and the variable speed device 122 permits the timing of its stroke so as to withdraw the stock from the storage loop under the bar 75 in intermittent movements equivalent to the rate at which it is fed thereinto by the rolls 73, 74 of the longitudinal slitter.

The apparatus is rapid, accurate and economical in operation, requiring few attendants and eliminating much time and labor in the matter of cooling, conveying and cutting the stock.

Modifications are possible within the scope of my invention, and I do not wholly limit my claims to the specific construction or the exact procedure described.

I claim:

1. The method of preparing hard rubber stock for battery jars or the like which comprises calendering the warm stock in a long strip, cooling and permitting shrinkage of the strip, and severing the strip transversely into jar blanks with a beveled cut, all of the said operations being performed without interwinding of the stock with a liner.

2. The method of forming units of plastic material which comprises sheeting the material in a continuous strip, slitting said strip longitudinally into a plurality of strips, feeding said strips in edge-to-edge relation, and transversely severing the set of strips at longitudinal intervals, the transverse cut being non-perpendicular to the plane of the strips, while the strips remain in edge-to-edge relation.

3. The method of forming rubber battery jar blanks which comprises calendering the stock, feeding the calendered stock from the calender, through an extended path, with one face and then the other exposed to the air while supporting it by engagement with the opposite face, to cool the stock, further feeding the stock in extension of said path, and longitudinally slitting it while so feeding it.

4. The method of preparing plastic sheet material which comprises sheeting the stock, feeding it through an extended path to cool it, progressively slitting it longitudinally into a plurality of strips, feeding said strips in edge-to-edge relation, and cutting the set of strips transversely at longitudinal intervals, the cut being non-perpendicular to the plane of the strips, to sever units therefrom, while the strips remain in edge-to-edge relation.

5. The method of preparing plastic sheet material which comprises softening the stock by heat, forming it, and propelling the stock with first one face and then the other exposed to the air while supporting it by engagement with the opposite face.

6. The method of forming units of plastic material which comprises softening the material by heat and progressively sheeting it in a continuous strip while it is so softened, feeding successive long lengths of the sheeted material into aligned positions for storage and cooling, and severing said lengths from the continuous strip, and withdrawing said lengths in succession from said position and cutting them into units.

7. The method of continuously preparing blanks of sheet rubber or the like which comprises continuously sheeting the warm stock, alternately delivering successive lengths of said stock to a pair of coolers, and alternately withdrawing the stock from the respective coolers and transversely severing it into blanks while the other cooler is being charged.

8. The combination, with a rubber sheeting device, of a pair of coolers adapted alternately to receive the sheeted stock therefrom, and a transverse slitter adapted alternately to receive the cooled stock from said coolers.

9. Apparatus for preparing sheet material, said apparatus comprising means for heating said material and sheeting it while it is so heated, and a set of supports adapted to feed the sheeted material from sheeting position with one face and then the other exposed while the opposite face bears upon said supports.

10. Apparatus for forming units of plastic material, said apparatus comprising means for sheeting the material in a continuous strip, means for slitting said strip longitudinally into a plurality of strips, means for feeding said strips in side-by-side edge-to-edge relation, and means for severing units from said strips by transverse cuts non-perpendicular to the plane of the unit while the strips remain in such relation.

11. Apparatus for forming units of plastic material, said apparatus comprising means for softening the material by heat and sheeting it while it is softened, means for feeding the sheeted material through an extended path to a slitting position, means for further feeding and thereafter progressively slitting it longitudinally into a plurality of strips, and means for severing successive units from said strips.

12. Apparatus for forming units of plastic material, said apparatus comprising a calender, means for receiving a sheet of stock from said calender and feeding it through an extended path to a slitting position, means at said position for progressively slitting the sheeted material longitudinally into a plurality of strips, and means for severing successive units from said strips by transverse cuts non-perpendicular to said strips.

13. Apparatus for forming unit of plastic material, said apparatus comprising a calender, means for receiving a sheet of material from said calender and feeding it through an extended path to a slitting position, means at said position for slitting it longitudinally into a plurality of strips, means for feeding said strips in edge-to-edge relation, and a traveling knife adapted to sever units from said strips by cuts non-perpendicular to the plane of the strips.

14. Apparatus for forming units of plastice material, said apparatus comprising means for softening the material by heat and sheeting it while it is so softened, means for feeding successive long lengths of the sheeted material into aligned positions, and means, adapted to receive material from said positions selectively, for severing said lengths into units.

15. Apparatus for forming units of plastic material, said apparatus comprising a calender, a sheet-feeding and storage device adapted to receive sheeted material from said calender, a cutter adapted to receive the material from said device, means for driving said device in time with said calender, and means for driving said device in time with said cutter, the first and second driving means being separately operable.

16. Apparatus for forming units of plastic material, said apparatus comprising a calender adapted to supply a sheet of said material, means for cutting said sheet longitudinally and transversely into units, and means adapted to receive the sheeted material from said calender and to supply it to said cutting means at different rates of speed corresponding respectively to the speed of the calendar and the speed of the cutting means.

17. Apparatus for forming units of plastic material, said apparatus comprising a calender, a sheet-feeding and storage means adapted to receive sheeted material from said calender, a second sheet-feeding and storage means adapted to receive sheeted material from said calender in alternation with the first said means, a stock cutting device adapted to receive material from either of said means selectively, means for driving said sheet-feeding and storage means, each independently of the other, in time with the calender, and means for driving them, each independently of the other in time with said cutting device.

18. Apparatus for forming units of plastic material, said apparatus comprising a calender, a sheet-feeding and storage means adapted to receive sheeted material from said calender, a stock-cutting device adapted to receive material from said sheet-feeding means, means for driving the latter in time with the calender, means for driving it in time with the cutting device, and means for assuring that one of said driving means shall be disabled when the other is effectively operating.

19. Apparatus for forming units of plastic material, said apparatus comprising means for delivering a continuous sheet of said material, stock-conveying and storage means comprising an endless belt carrier and adapted to receive the sheeted material from said sheet-delivering means, a second stock-conveying and storage means comprising an endless belt carrier and adapted to receive the sheeted material from said sheet-delivering means, a stock-cutting device adapted to receive the sheeted material from one or the other of said storage means selectively, and means for driving said stock-conveying and storage means, each independently of the other, in time with the sheet-delivering means, and means for driving them, each independently of the other, in time with the cutting device.

20. Apparatus for forming units of plastic material, said apparatus comprising means for delivering a continuous sheet of said material, means for feeding said sheet through an extended path to a slitting position, means for feeding said material past said slitting position and slitting it longitudinally into a plurality of strips, means for intermittently feeding said strips from slitting position while maintaining them in orderly edge-to-edge relation, and a traveling knife adapted to run transversely of the set of strips between their successive forward movements and sever units therefrom.

21. Apparatus for forming units of plastic sheet material, said apparatus comprising means for supplying a long length of said material, means for progressively slitting said length of material longitudinally into a plurality of strips, an endless belt carrier adapted to receive said strips in orderly side-by-side relation from said slitting means, and so positioned as to allow a storage loop between the two, means for intermittently driving said carrier, and a transversely reciprocating knife adapted to sever said strips between forward movements thereof on said carrier.

22. Apparatus for forming units of sheet material, said apparatus comprising a longitudinal slitter adapted to feed a sheet of said material and progressively slit it longitudinally into a plurality of strips, a conveyor adapted to receive said strips in orderly, side-by-side relation from said slitter, and so positioned as to permit a storage loop between the two, means for intermittently driving said conveyor, said means being adjustable to vary the length of the movements of said conveyor, means for transversely severing said strips within the length of said conveyor, between successive movements thereof, and interconnected means for driving said slitter and said conveyor, the last said means including a variable speed device interposed operatively between the two.

23. Apparatus for forming units of sheet material, said apparatus comprising a longitudinal slitter adapted to feed a sheet of said material and progressively slit it longitudinally into a plurality of strips, an endless-belt carrier adapted to receive said strips in orderly, side-by-side relation from said slitter and so positioned as to permit a storage loop between the two, a rack-pinion-ratchet-pawl device for intermittently driving said carrier, means for varying the length of stroke of the rack, means for transversely severing said strips within the length of said carrier, between successive movements thereof, and interconnecting means for driving said slitter and said carrier, the last said means including a variable speed device interposed operatively between the two.

24. Apparatus for forming units of plastic sheet material, said apparatus comprising a calender, sheet-feeding and storage means adapted to receive sheeted stock from said calender, and driving means operatively connecting said sheet-feeding and storage means with said calender, said driving means including a variable speed device.

25. Apparatus for forming units of plastic sheet material, said apparatus comprising a calendar, sheet-feeding and storage means adapted to receive sheeted stock from said calender, driving means operatively connecting said sheet-feeding and storage means with said calender, an endless belt carrier adapted to convey the sheeted material from the calender to the sheet-feeding and storage means, an end roll for said carrier journaled adjacent the last said means and operatively connected with said driving means, and a loosely journaled end roll for said carrier journaled on a structure adapted to be moved in one direction to extend said carrier toward the calendar and to be moved in the opposite direction to withdraw said belt so as to permit access to the calender.

26. Apparatus for forming units of sheet material, said apparatus comprising a frame structure, end rolls for a set of endless belt carriers journaled thereon, a second frame structure aligned with and at a distance from the first frame structure, end rolls for a set of endless belt carriers journaled thereon, a set of superposed endless carrier belts mounted on said end rolls and extending between said frame structures, said end rolls being so positioned that said carriers are adapted to pass a continuous sheet of stock by gravity from one carrier to another, and interconnected means for driving one end roll of each carrier, the opposite end roll thereof being an idler and the driving rolls of adjacent carriers being at opposite ends thereof, and said driving means being adapted to drive the belt driving rolls in such directions as directly to draw the upper reaches of the carriers.

27. Apparatus for forming units of plastic sheet material, said apparatus comprising means for delivering a continuous sheet of said material, cooler devices adapted to receive said material as delivered by the first said means and to give it off at a rate independent of the speed of the first said means, and a blank cutting mechanism adapted to receive the material from said cooler device.

28. Apparatus for forming units of plastic sheet material, said apparatus comprising means for softening the material by heat and sheeting it while it is softened, means for feeding the sheeted material through an extended path, with one face and then the other exposed to the air, to cool it, and means for cutting the cooled stock into units.

29. Apparatus for preparing plastic stock, said apparatus comprising means for softening the stock by heat and for shaping it while it is so softened, and cooling means adapted to receive the stock from said shaping means and to propel it therefrom through an extended path with one face and then the other of the stock exposed while it is supported by engagement with the opposite face.

In witness whereof I have hereunto set my hand this 23 day of July, 1923.

CHARLES W. LEGUILLON.